P. P. HARING.
COTTON PICKER.
APPLICATION FILED JAN. 18, 1911. RENEWED JUNE 3, 1912.
1,054,113.
Patented Feb. 25, 1913.
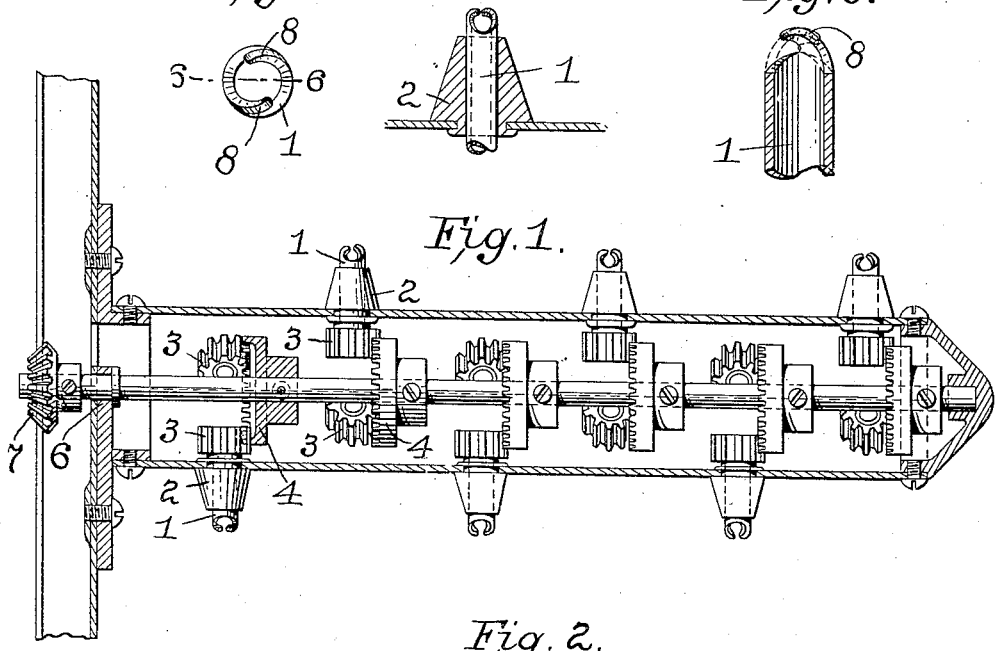
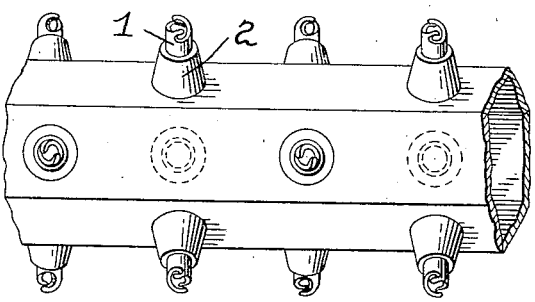
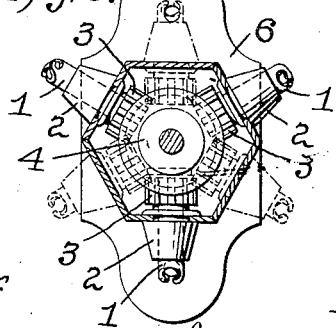
Attest:
Ewd R. Tolson
Bent M. Stahl
Inventor:
Peter Paul Haring,
by Spear, Middleton, Donaldson & Spear
Attys.

UNITED STATES PATENT OFFICE.

PETER PAUL HARING, OF GOLIAD, TEXAS.

COTTON-PICKER.

1,054,113.  Specification of Letters Patent.  Patented Feb. 25, 1913.

Application filed January 18, 1911, Serial No. 603,352. Renewed June 3, 1912. Serial No. 701,430.

*To all whom it may concern:*

Be it known that I, PETER P. HARING, citizen of the United States, residing at Goliad, Texas, have invented certain new and useful Improvements in Cotton-Pickers; of which the following is a specification.

My present invention is an improvement upon cotton picking machinery, and relates particularly to the construction and arrangement of the picker spindles.

The invention consists in the features of construction and combination and arrangement of parts hereinafter described and particularly pointed out in the claims.

In the accompanying drawings: Figure 1 is a sectional view through a picker arm showing the picker spindles mounted thereon and the driving means therefor; Fig. 2 is a side elevation of a portion of the picker arm with the picker spindles thereon; Fig. 3 is a sectional view across the picker arm with the picker spindles thereon; Fig. 4 is a sectional view through one of the cones with its picker spindle; Fig. 5 is an end view of the picker spindle; and Fig. 6 is a sectional view of the said picker spindle substantially on the line 6—6 of Fig. 5.

In carrying out my present invention, I use a picker arm hexagonal in cross section, and upon the faces of this arm the picker spindles are mounted in groups of three; that is to say, near the outer end of the picker arm there are a series of picker spindles disposed in the same transverse plane, but upon alternate faces of the picker arm, as shown in full lines in Fig. 3. At a point in rear of this first group or series of picker spindles there is another group of three spindles, these being in the one plane transversely of the picker arm, and upon the faces which alternate with the faces upon which the first series of picker spindles is located, as shown in dotted lines in Fig. 3. Farther along the picker arm there is another series or group of picker spindles occupying the same faces of the arm as the first group mentioned above, and this order of picker spindles or grouping thereof is continued along the arm until there are six groups of three each, the said groups being arranged upon the alternate faces of the picker arm. The picker spindles 1 are mounted in cones 2 which, in turn, are mounted upon the shell of the picker arm, as shown in Fig. 4. The spindles have on their inner ends gear wheels 3 which are representative of any suitable form of driving wheel adapted for this work. These gear wheels mesh with other gear wheels 4 on a central shaft 5, journaled in the end of the picker arm, as shown in Fig. 1, and in the bracket 6, the said shaft carrying a beveled gear 7 by which it is driven. This gearing is representative of either bevel, spur and crown gearing or worm gearing which may be used for this drive.

The picker spindles, particularly in respect of their engaging fingers, form an important part of my invention.

The object of this part of said invention is to facilitate the release of the cotton from the fingers, after it has been carried by said finger to the proper point of discharge, and to effect such release by mere reversal of rotation of the picker spindle.

In my former U. S. Patents 587201 and 796421 are shown rotating picker spindles carrying catching points, which by the rotation, engage and hold the cotton and pull it from its place in the boll. These points project in a direction approximately parallel with the axis of the spindle, and with also an outward curve, and in Patent 796421 the points or fingers incline also slightly forward in the direction of the engaging rotation.

In my present invention, I have had in view the easy release of the cotton from the points or fingers, simply by reversed rotation of the spindle without impairing the grip of the fingers upon the cotton in the forward rotation. To this end I have so formed the fingers and arranged them upon the end of the spindle at the edge, that, in the forward rotation they will enter into and engage the cotton, while upon reverse movement, these fingers will be drawn directly out of the cotton and so absolutely release it by this reverse movement alone. I have shown the spindle in the form of a tube, this being most convenient, and the form which I preferably use. The metal of the tube being of a proper thickness, the fingers may be cut out of this metal at the end of the tube. I have found two of these fingers (as shown) to be operative. As to the form of these fingers, I refer to Figs. 4, 5 and 6 of my drawings. The fingers 8, 8, are formed on the wall of the tube and project in line therewith, but the ends are bent to approximately horizontal position, and in the direction of the forward, or engaging movement of the spindle. It will be specially observed that these fingers do not project outward, but preferably slightly inward and downward at the extreme ends. By this I secure better engagement and avoid all entangling effect of lateral movement of the fingers upon the fiber in reversal. But the general direction of the main part of the fingers is in line with their movement in rotation. It will be observed, in the Figs. 4, 5 and 6, that there is a cavity within these fingers. Into this, and between the ends of the fingers, the cotton is pressed, as the end of the spindle is moved against the boll. The rotation of the spindle immediately carries the fingers directly into the fiber, to engage it. This engagement continues increasingly, during the forward movement of rotation. But when this movement is reversed, the fingers are drawn directly back and directly out of the cotton, which is thereby released, for the reason that there is no lateral movement of the fingers in the fiber.

In order to discharge the cotton from the spindle, it is simply necessary to reverse the rotary movement of the picker spindle, the said spindle maintaining its longitudinal position in the cone. The construction of the points is such that they will not deface or injure the leaf of the plant or the hand of the attendant or operative, because the points which are curved inward are slightly depressed. This construction also insures the cotton when once inside the picker spindle being held firmly thereby. The cross sectional shape of the arm may be varied, and may be circular if desired.

I claim as my invention:

1. In a cotton picking machine, a picker finger, a carrier for the picker finger, on which said finger is mounted to rotate, said finger having at its outer end a plurality of cotton engaging projections at the end and extending in a general direction lengthwise of the finger, and means for rotating the said cotton picking finger, said cotton engaging projections extending also substantially in the direction of the said edge with their points slightly depressed, substantially as described.

2. In a cotton picking machine, a carrier for a finger, a picker finger mounted to rotate on said carrier, and having cotton engaging projections extending in a general direction lengthwise of the finger and substantially circumferentially of said finger with their points turned inwardly in respect to the axis of the spindle, substantially as described.

3. In a cotton picking machine, a carrier combined with a picker finger mounted to rotate on said carrier, and having at its outer end a plurality of cotton engaging projections, and means for rotating the said cotton picking finger, said cotton engaging projections extending circumferentially of the finger with their points slightly depressed, and turned inwardly in respect to the axis of the spindle, substantially as described.

4. In a cotton picking machine, a picker arm combined with a plurality of picker fingers mounted to rotate and held against axial movement, said picker arm having a plurality of faces with the picker fingers disposed on the adjacent faces of said arm, those on one face being staggered in relation to those on the adjacent face, said picker fingers being self-clearing by reversing their rotation, and means for giving the picker fingers their forward and backward rotation, substantially as described.

5. In a cotton picking machine, a frame, carrying wheels upon which the frame is mounted to be drawn through the field, carrier means movably mounted on the frame, picker fingers mounted on the picker carrier means, means for rotating the fingers, said fingers having at their outer ends hook-shaped projections extending beyond said ends in a general direction substantially parallel with the axis of rotation, and pointing circumferentially of the fingers, substantially as described.

6. In a cotton picking machine, a frame, carrying wheels upon which the frame is mounted to be drawn through the field, picker fingers, means for rotating the fingers, said fingers having at their outer ends hook-shaped projections extending beyond said ends in a general direction substantially parallel with the axis of rotation and with their ends directed substantially circumferentially of the fingers, said points having between them a space entirely free from side to side of the end of the picker finger for the reception of the cotton, and carrier means movably mounted on the frame and carrying the picker fingers in position to engage the cotton as the machine traverses the field, substantially as described.

7. In combination in a cotton picking machine, a frame, carrying wheels therefor, carrier means for picker fingers movably mounted on the frame, picker fingers mounted on the carrier means to rotate, said fingers consisting each of a tubular shaft having projections at its outer edge of hook-shape extending in a general direction in the plane of the wall of the tube and with their points directed substantially circumferentially of the fingers, and means for rotating the fingers, substantially as described.

8. In combination in a cotton picking machine, a frame, carrying wheels therefor, carrier means for picker fingers movably mounted on the frame, picker fingers mounted on the carrier means to rotate, said picker fingers having projections extending beyond their ends in a general direction parallel with the axis of the finger and of hook-shape, and pointing substantially circumferentially, and means for rotating the fingers forwardly at one point in their travel and for rotating them rearwardly at another point in the travel, said fingers being held against axial movement, whereby the cotton may be picked and cleared by simply rotating the fingers, substantially as described.

In testimony whereof, I affix my signature in presence of two witnesses.

PETER PAUL HARING.

Witnesses:
　Wayne Davis,
　R. P. Appleby.